(12) United States Patent
Barrett

(10) Patent No.: US 8,312,376 B2
(45) Date of Patent: Nov. 13, 2012

(54) BOOKMARK INTERPRETATION SERVICE

(75) Inventor: Peter T. Barrett, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 903 days.

(21) Appl. No.: 12/062,497

(22) Filed: Apr. 3, 2008

(65) Prior Publication Data

US 2009/0254823 A1 Oct. 8, 2009

(51) Int. Cl.
G06F 3/00 (2006.01)
G06F 3/048 (2006.01)
(52) U.S. Cl. .................. 715/716; 715/810; 715/764
(58) Field of Classification Search .................. 715/810, 715/764, 716
See application file for complete search history.

(56) References Cited

U.S. PATENT DOCUMENTS

| 6,289,346 | B1 | 9/2001 | Milewski et al. | |
|---|---|---|---|---|
| 6,583,799 | B1 * | 6/2003 | Manolis et al. | 715/838 |
| 6,657,702 | B1 * | 12/2003 | Chui et al. | 355/40 |
| 7,043,691 | B1 * | 5/2006 | Kwon et al. | 715/705 |
| 7,143,353 | B2 | 11/2006 | McGee et al. | |
| 7,167,901 | B1 * | 1/2007 | Beadle et al. | 709/207 |
| 7,606,883 | B1 * | 10/2009 | Allibhoy et al. | 709/223 |
| 7,703,002 | B2 * | 4/2010 | Barrus et al. | 715/233 |
| 7,739,583 | B2 * | 6/2010 | Barrus et al. | 715/201 |
| 7,899,829 | B1 * | 3/2011 | Malla | 707/741 |
| 2002/0135621 | A1 * | 9/2002 | Angiulo et al. | 345/838 |
| 2004/0205543 | A1 * | 10/2004 | Awada et al. | 715/512 |
| 2004/0218904 | A1 | 11/2004 | Yoon et al. | |
| 2004/0223737 | A1 | 11/2004 | Johnson | |
| 2005/0044561 | A1 | 2/2005 | McDonald | |
| 2005/0114897 | A1 | 5/2005 | Cho et al. | |
| 2005/0183119 | A1 * | 8/2005 | Hofrichter et al. | 725/46 |
| 2005/0210145 | A1 * | 9/2005 | Kim et al. | 709/231 |
| 2007/0033170 | A1 | 2/2007 | Sull et al. | |
| 2007/0150930 | A1 | 6/2007 | Koivisto et al. | |
| 2007/0156627 | A1 | 7/2007 | D'Alicandro | |
| 2007/0288426 | A1 | 12/2007 | Schachter | |

OTHER PUBLICATIONS

Trafford, "Linking Sites with Social Bookmarks Using Special EDUCAUSE Tags", Sep. 11, 2007, pp. 7.
Golder et al., "The Structure of Collaborative Tagging Systems", Journal of Information Science, 32(2), 2006, HP Labs, pp. 8.
Benz et al., "Automatic Bookmark Classification: A Collaborative Approach", May 22-26, 2006, WWW 2006, pp. 8.

* cited by examiner

*Primary Examiner* — Nicholas Augustine
*Assistant Examiner* — Erik Stitt
(74) *Attorney, Agent, or Firm* — Wolfe-SBMC

(57) ABSTRACT

A bookmark interpretation service is described. In embodiment(s), a bookmark save event can be received from a media device when a bookmark is initiated while a video stream of media content is rendered by the media device, such as when the bookmark is initiated by a viewer at the media device. The bookmark can then be interpreted to determine one or more bookmark representations based on a context interpretation of the bookmark with respect to the media content. The bookmark can be maintained for selection, and when a request for the bookmark is received, one or more of the bookmark representations that correspond to the bookmark can be provided to the media device from which the request for the bookmark is received.

20 Claims, 6 Drawing Sheets

BOOKMARK INTERPRETATION SERVICE

BACKGROUND

Viewers have an ever-increasing selection of media content to choose from, such as television programming, on-demand movies and music, and/or recorded media content that is available for streaming from a content distributor to a media device. For example, scheduled television programming can be recorded at the time of broadcast when initially distributed for viewing, and can then be made available for on-demand viewing when requested via a media device. This is commonly referred to as Network Digital Video Recording (nDVR) and a viewer can request the recorded television content, such as movies and television programs, when convenient for the viewer.

A viewer can request the media content for viewing and/or playback from any number of various media devices, such as wired and/or wireless devices, to include a television client device (e.g., a television set-top box or a digital video recorder (DVR)), a broadcast-enabled computer device, a portable media content player, and the like. Given the ever-increasing selection and variety of media content (e.g., television programming, movie choices, music, etc.) that is available, as well as the many devices that can be utilized for viewing and/or playback of the media content, users may want to locate media content that is of interest to them, send or receive recommended media content, and organize the available media content, such as to identify specific media content items and/or specific points of interest in various media content items.

SUMMARY

This summary is provided to introduce simplified concepts of a bookmark interpretation service. The simplified concepts are further described below in the Detailed Description. This summary is not intended to identify essential features of the claimed subject matter, nor is it intended for use in determining the scope of the claimed subject matter.

A bookmark interpretation service is described. In embodiment(s), a bookmark save event can be received from a media device when a bookmark is initiated while a video stream of media content is rendered by the media device, such as when the bookmark is initiated by a viewer at the media device. The bookmark can then be interpreted to determine one or more bookmark representations based on a context interpretation of the bookmark with respect to the media content. The bookmark can be maintained or otherwise persisted by the service for selection, and when a request for the bookmark is received, such as a bookmark view or play request, one or more of the bookmark representations that correspond to the bookmark can be provided to the media device from which the request for the bookmark is received.

In other embodiment(s), a bookmark save event can be received and the media content from which the bookmark save event is initiated can be recorded. A bookmark representation that corresponds to the bookmark can then represent an on-demand recording of the media content, and the bookmark representation that is persisted by the bookmark interpretation service can be a pointer or reference to the recorded instance of the media content. In alternate embodiments, a bookmark can be interpreted to determine bookmark representations based on a type of media device from which a bookmark save event is received and/or based on a profile of a user that initiates the bookmark save event at the media device. In another embodiment, a request to share a bookmark can be received from a media device, and the requested bookmark can be communicated to an additional media device, such as an email communication.

In other embodiment(s), a bookmark representation that is maintained or otherwise persisted by the bookmark interpretation service can be dynamically interpreted to represent any number of various aspects of the media content from which it was selected. For example, a bookmark representation can represent or otherwise correspond to the media content itself (e.g., a movie, music video, television program, advertisement, etc.), a scene in the movie, the song of a music video, the music playing in a background of a movie, an episode of a television program, a sports play occurring in a sporting event, a product or service offered in an advertisement or as part of the program content (e.g., product placement), a person (e.g., actor, actress, character, director) associated with the media content, or any other related aspect of the media content that can be derived automatically from the media context or explicitly associated with the media content by editing or association techniques, or as a provision of the metadata that is associated with the media content.

BRIEF DESCRIPTION OF THE DRAWINGS

Embodiments of a bookmark interpretation service are described with reference to the following drawings. The same numbers are used throughout the drawings to reference like features and components.

DETAILED DESCRIPTION

Figure 1:
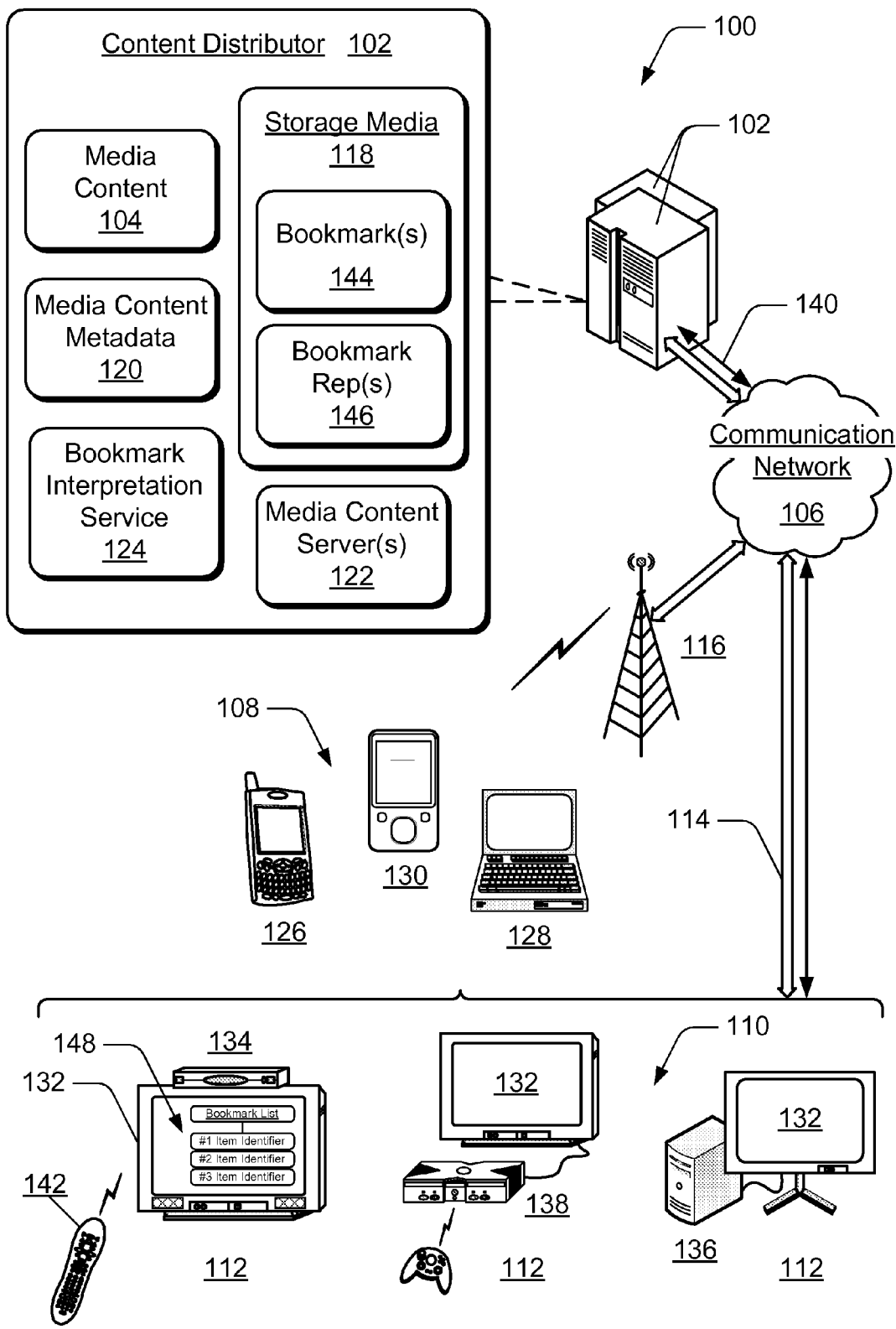
FIG. 1 illustrates an example system in which embodiments of a bookmark interpretation service can be implemented.

Embodiments of a bookmark interpretation service provide that a bookmark save event can be received from a media device when a bookmark is initiated while a video stream of media content is rendered by the media device. A bookmark can be initiated or created as an identifier or reference that corresponds to a specific piece of media content, or segment thereof. A bookmark can also optionally indicate start and/or end points that define a segment of the media. A viewer or other user can initiate a bookmark save event to "save" or create a bookmark, such as by pressing a "bookmark" selectable button on a remote control device. The viewer can then later request to "view", "play", or "share" the bookmark, or representations that correspond to the bookmark.

When a bookmark save event is initiated at a media device, such as by a viewer or other user, a bookmark interpretation service can receive the bookmark save event and initially interpret the bookmark in a context of the media content from which the bookmark is initiated to determine bookmark representations that correspond to the bookmark. In addition, a bookmark can be interpreted based on a profile of a user that initiates the bookmark save event and/or based on a type of media device from which the bookmark is initiated.

When a viewer or other user requests a bookmark to view, play, or share the bookmark, the bookmark interpretation service can update the bookmark representations and/or determine additional bookmark representations, resources, assets, and/or functionality that corresponds to the requested bookmark. The bookmark interpretation service can then provide the bookmark representations that correspond to the bookmark to the media device from which the request for the bookmark is received. Additionally, a request to share a bookmark can be received from a media device, and the requested bookmark can be communicated to an additional media device, such as via an email message.

The bookmark interpretation service can interpret or otherwise determine the bookmark representations that correspond to a bookmark as any number of various aspects of the media content from which the bookmark was initiated. For example, a bookmark representation can represent or otherwise correspond to the media content itself (e.g., a movie, music video, television program, advertisement, etc.), a scene in the movie, the song of a music video, the music playing in a background of a movie, an episode of a television program, a sports play occurring in a sporting event, a product or service offered in an advertisement or as part of the program content (e.g., product placement), a person (e.g., actor, actress, character, director) associated with the media content, or any other aspect of the media content.

A bookmark and the various corresponding bookmark representations can be maintained, or otherwise persisted, by a bookmark interpretation service. When a viewer or other user requests a bookmark via a media device to view, play, or share the bookmark, the bookmark interpretation service can return the updated and/or additional bookmark representations, resources, assets, and/or functionality to the media device in a format that can be processed, rendered, and/or displayed at the media device. The bookmark representations can also be presented in a user interface as additional viewing options related to the bookmarked media content.

While features and concepts of the described systems and methods for a bookmark interpretation service can be implemented in any number of different environments, systems, and/or various configurations, embodiments of a bookmark interpretation service are described in the context of the following example systems and environments.

FIG. 1 illustrates an example system 100 in which various embodiments of a bookmark interpretation service can be implemented. In this example, system 100 includes one or more content distributors 102 that communicate or otherwise provide media content 104 to any number of various media devices via a communication network 106. The various media devices can include wireless media devices 108 as well as other client devices 110 (e.g., wired and/or wireless devices) that are implemented as components in various client systems 112 in a media content distribution system.

The communication network 106 can be implemented to include a broadcast network, an IP-based network 114, and/or a wireless network 116 that facilitates media content distribution and data communication between the content distributors 102 and any number of the various media devices. The communication network 106 can also be implemented as part of a media content distribution system using any type of network topology and/or communication protocol, and can be represented or otherwise implemented as a combination of two or more networks.

In the example system 100, a content distributor 102 includes storage media 118 to store or otherwise maintain various data and media content, such as media content 104, media content metadata 120, and/or recorded on-demand assets. In a Network Digital Video Recording (nDVR) implementation, recorded on-demand assets can be recorded when initially distributed to the various media devices as scheduled television media content. The storage media 118 can be implemented as any type of memory, random access memory (RAM), a nonvolatile memory such as flash memory, read only memory (ROM), and/or other suitable electronic data storage. Content distributor 102 can also include one or more media content servers 122 that are implemented to communicate, or otherwise distribute, the media content 104, media content metadata 120, recorded on-demand assets, and/or other data to any number of the various media devices.

The media content 104 and/or recorded on-demand assets (e.g., recorded media content) can include any type of audio, video, and/or image media content received from any type of media content source. As described throughout, "media content" can include television programs (or programming), advertisements, commercials, music, movies, and on-demand media content. Other media content can include interactive games, network-based applications, and any other audio, video, and/or image content (e.g., to include program guide application data, user interface data, search results and/or recommendations, and the like).

Content distributor 102 also includes a bookmark interpretation service 124 that can be implemented as computer-executable instructions and executed by processor(s) to implement the various embodiments and/or features described herein. In addition, a content distributor 102 can be implemented with any number and combination of differing components as further described with reference to the example device shown in FIG. 5 and/or the example content distributor shown in FIG. 6. The bookmark interpretation service 124, as well as other functionality described to implement embodiments of a bookmark interpretation service, can also be provided as a service apart from the content distributor 102 (e.g., on a separate server or by a third party service).

The wireless media devices 108 can include any type of device implemented to receive and/or communicate wireless data, such as any one or combination of a mobile phone device 126 (e.g., cellular, VoIP, WiFi, etc.), a portable computer device 128, a media device 130 (e.g., a personal media player, portable media player, etc.), and/or any other wireless media device that can receive media content in any form of audio, video, and/or image data. Each of the client systems 112 include a respective client device and display device 132 that together render or playback any form of audio, video, and/or image media content.

A display device 132 can be implemented as any type of a television, high definition television (HDTV), LCD, or similar display system. A client device in a client system 112 can be implemented as any one or combination of a television client device 134 (e.g., a television set-top box, a digital video recorder (DVR), etc.), a computer device 136, a gaming system 138, an appliance device, an electronic device, and/or as any other type of client device that may be implemented to receive media content in any form of audio, video, and/or image data in a media content distribution system.

Any of the media devices can be implemented with one or more processors, communication components, memory components, signal processing and control circuits, and a media content rendering system. Further, any of the wireless media devices 108 and/or other client devices 110 can be implemented with any number and combination of differing components as further described with reference to the example media device shown in FIG. 2 and/or the example device shown in FIG. 5. A media device may also be associated with a user or viewer (i.e., a person) and/or an entity that operates the device such that a media device describes logical devices that include users, software, and/or a combination of devices.

Any of the wireless media devices 108 and/or other client devices 110 can communicate with any number of content distributors 102 via a two-way data communication link 140 of the communication network 106. It is contemplated that any one or more of the arrowed communication link 140, IP-based network 114, and wireless network 116, along with communication network 106, facilitate two-way data communication, such as from a media device to a content distributor 102 and vice-versa.

The bookmark interpretation service 124 at content distributor 102 can receive a bookmark save event from any one of the various media devices, such as when a user or viewer at a media device (e.g., television client device 134) initiates a bookmark save event with a remote control device 142. A bookmark save event can be initiated at a media device while a video stream of media content is rendered by the media device. In one or more embodiments, a bookmark save event can be received and maintained or otherwise persisted as a bookmark that is represented as a time indication of a position within the video stream and/or the media content from which the bookmark save event is initiated.

Other techniques to discern a bookmark when initiated as a bookmark save event are contemplated, such as using a Web tool to mark start and end times or points for a video sub-segment of interest, using a remote control button (or buttons) to indicate the start and end times or points of the video sub-segment, indicating via a user interface that an entire video stream of media content is of interest (e.g., selecting a bookmark button on a remote control device to select the program title on a user interface, or similar functionality in a Web environment), and other techniques.

The storage media 118 at content distributor 102 can be utilized to maintain or otherwise store the bookmarks 144 that are received from the various media devices as the bookmark save events. In addition, the storage media 118 can be utilized to maintain bookmark representations 146 that correspond to the respective bookmarks 144. The bookmark interpretation service 124 and/or the content distributor 102 can also be implemented to correlate the various bookmarks 144 and corresponding bookmark representations 146 with respective users, media devices, and/or combinations thereof. In various embodiments, the bookmark interpretation service correlates a bookmark 144 with corresponding bookmark representations 146 when a viewer or user requests to view, play, or share a bookmark.

When a bookmark save event is received, the bookmark interpretation service 124 can initially interpret the associated bookmark 144 to determine one or more bookmark representations 146 based on a context interpretation of the bookmark with respect to the media content from which the bookmark save event is initiated. A bookmark representation 146 can be interpreted to represent any number of various aspects of the media content from which a bookmark save event is initiated, as described above by way of example and not limitation.

The bookmark interpretation service 124 can include various techniques to determine whether the media content from which a bookmark save event is initiated is a movie or other television media content, is an advertisement, has associated music playing in a background of the media content, and/or includes a person associated with the media content. In various embodiments, these techniques to determine the media content can be derived implicitly, or may be derived explicitly and provided in metadata that accompanies a media stream of media content. In one embodiment, the bookmark interpretation service 124 can evaluate the media content metadata 120 that is associated with the media content to determine a type of the media content. Other various techniques can be implemented to discern an advertisement or advertisement pod that is spliced into a video stream of media content, and/or to determine the song playing in a background of a movie or music video.

The bookmark interpretation service 124 can be implemented to interpret, update, or expand the bookmark representations 146 (e.g., one or more of the bookmark representations) that correspond to a selected bookmark 144 based on any combination of several factors. In one example, the bookmark interpretation service 124 can interpret a selected bookmark based on a profile of a user that initiates the bookmark save event at a media device. A content distributor 102 in a media content distribution system can track previous user requests for various types of media content, such as on-demand movies, streaming music, and the like. Based on previous user requests and media content preferences, the bookmark interpretation service 124 can interpret a selected bookmark to determine bookmark representations 146 that correspond to the user and/or user preferences.

The bookmark interpretation service 124 can also interpret, update, or expand the bookmark representations 146 that correspond to a selected bookmark 144 based on a type of the media device from which a bookmark save event, or a bookmark view or play event, is initiated and received. For example, if a request for a bookmark 144 (e.g., a bookmark view or play event) is initiated or selected from a mobile phone device 126, then the bookmark interpretation service 124 can determine a bookmark representation 146 of media content that is accessible to and/or can be rendered for playback or viewing on the mobile phone device. Similarly, if a request for a bookmark 144 is selected or initiated at a television client device 134, then the bookmark interpretation service 124 can determine a bookmark representation 146 of media content that is accessible to and/or can be rendered for playback or viewing by the television client device.

The bookmark interpretation service 124 can also be implemented to initiate a recording of the media content from which a bookmark save event is initiated. For example, a bookmark save event can be received from a media device (e.g., television client device 134) and the bookmark interpretation service 124 can then initiate that the content distributor 102 record and maintain the media content as a recorded on-demand asset (e.g., an nDVR recording) that is associated with the particular media device. A bookmark representation 146 of the bookmark 144 can represent the recorded on-demand asset that corresponds to the received bookmark save event and associated bookmark 144.

When a request for a bookmark is received, such as from a user at a media device (e.g., television client device 134), the bookmark interpretation service 124 can initiate providing one or more of the bookmark representations 146 that correspond to the requested bookmark. In an embodiment, the bookmark interpretation service 124 can provide or otherwise communicate bookmark data (e.g., the bookmark representations 146) to a media device (e.g., television client device 134) for a bookmark user interface 148 that displays a bookmark list of the bookmark representations 146 that correlate to respective bookmarks 144, and from which the respective bookmark representations 146 can be selected.

When a viewer or other user requests a bookmark 144 to view, play, or share the bookmark, the bookmark interpretation service 124 can update the bookmark representations 146 and/or determine additional bookmark representations, resources, assets, and/or functionality that corresponds to the requested bookmark. The bookmark interpretation service 124 can then provide the bookmark representations 146 that correspond to the bookmark to the media device from which the request for the bookmark is received. Additionally, a request to share a bookmark can be received from a media device, and the requested bookmark can be communicated to an additional media device, such as via an email message.

Although illustrated and described as a component or module of the content distributor 102, the bookmark interpretation service 124 can be implemented as an independent service to implement embodiments of a bookmark interpretation service. Further, although the bookmark interpretation service 124 is illustrated and described as a single component or module, the bookmark interpretation service 124 can be implemented as several component applications or modules distributed to implement various embodiments of a bookmark interpretation service as described herein.

Figure 2:
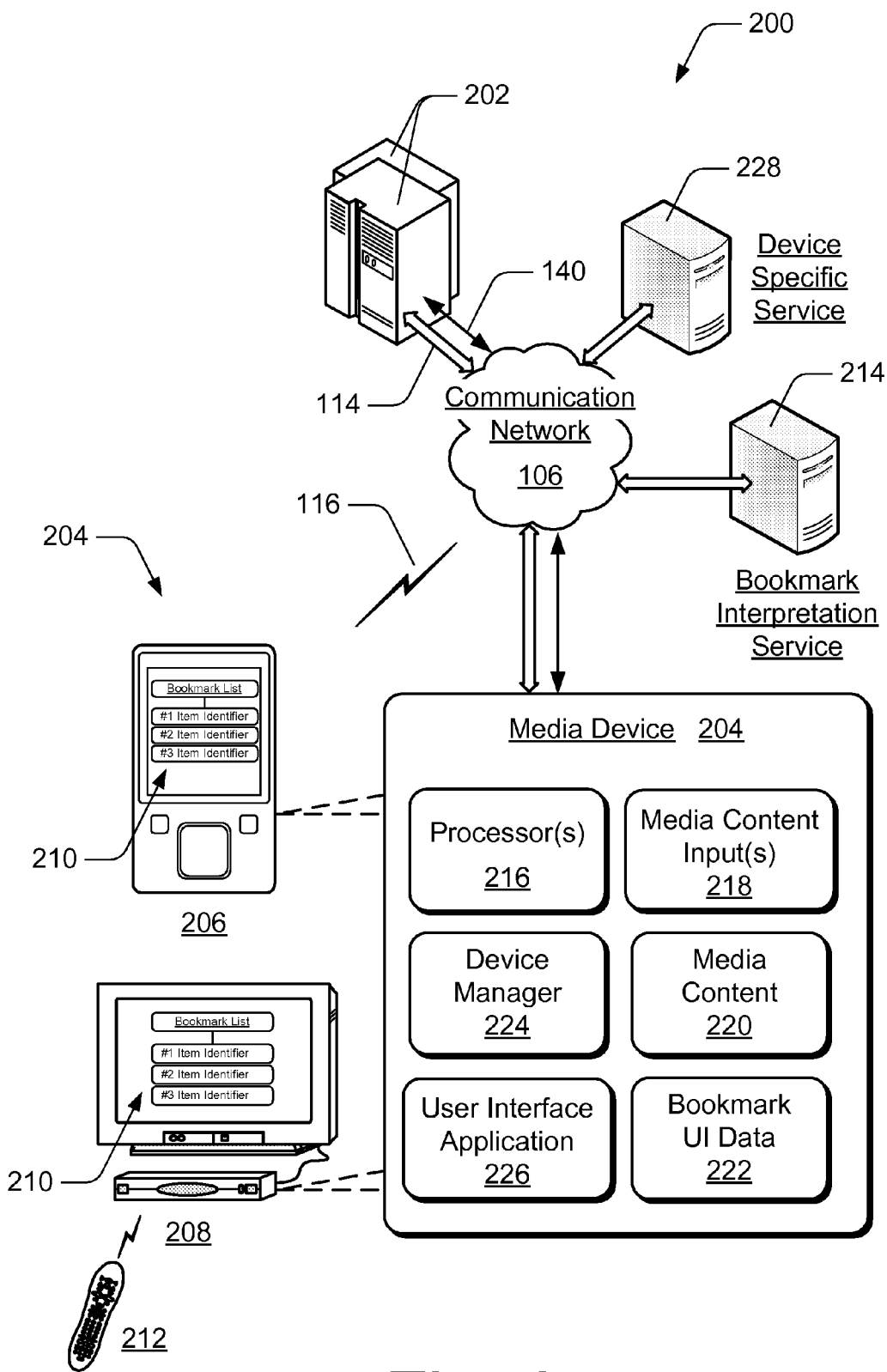
FIG. 2 illustrates another example system in which embodiments of a bookmark interpretation service can be implemented.

FIG. 2 illustrates an example system 200 in which various embodiments of a bookmark interpretation service can be implemented. In this example, system 200 includes one or more content distributors 202 and examples of wired and/or wireless media devices 204, such as a portable media device 206 and a television client device 208. A media device 204 can display various types of media content, as well as a bookmark user interface 210. A viewer can interact with a media device 204 and initiate viewer navigation inputs and selections of bookmark representations in a bookmark list from the bookmark user interface 210 with user inputs, such as on the portable media device 206 or with a remote control input device 212. For example, the bookmark user interface 210 can be selected with remote control inputs to scroll the list of bookmark representations up and/or down to display and select the various bookmark representations.

An example of a content distributor is described with reference to content distributor 102 shown in FIG. 1. However, in this example system 200, a bookmark interpretation service 214 is independent and implemented apart from content distributor 202 (e.g., on a separate server or by a third party service). The bookmark interpretation service 214 can be implemented as an optional service and/or as a service that users pay for to receive bookmark representations and/or a bookmark user interface 210. The content distributor 202, bookmark interpretation service 214, and the media devices 204 can all be implemented for communication with each other via the communication network 106, the IP-based network 114, and/or the wireless network 116.

In the example system 200, a media device 204 includes one or more processors 216 (e.g., any of microprocessors, controllers, and the like), media content inputs 218, and media content 220 (e.g., received media content, media content that is being received, recommended media content, recorded media content, etc.). The media content inputs 218 can include any type of wireless, broadcast, and/or over-the-air inputs via which media content is received. In addition, media device 204 can receive bookmark user interface data 222 from a content distributor 202 and/or the bookmark interpretation service 214 via the media content inputs 218.

Media device 204 can also include a device manager 224 (e.g., a control application, software application, signal processing and control module, etc.) that can be implemented as computer-executable instructions and executed by the processors 216 to implement various embodiments and/or features of a bookmark interpretation service. The device manager 224 can be implemented to monitor and/or receive selectable inputs (e.g., viewer selections, navigation inputs, etc.) via an input device 212, and initiate communication of user selections back to a content distributor 202 and/or the bookmark interpretation service 214.

Media device 204 can also include a user interface application 226 that can be implemented as computer-executable instructions and executed by the processors 216 to implement various embodiments and/or features of a bookmark interpretation service. The user interface application 226 can process the bookmark user interface data 222 from which the bookmark user interface 210 can be rendered and/or displayed for viewing at a media device 204.

In an embodiment, the example system 200 may also include a device specific service 228, such as for when a user initiates requests for bookmark(s) from a gaming system. The bookmark interpretation service 214 and/or the device specific service 228 can provide bookmark user interface data for gaming applications that correspond to multiple representations of respective bookmarks to a media device 204 based on whether the media device can receive and render the media content that is represented by the respective bookmark representations. For example, the bookmark representations can correlate to and represent video games that have been determined from selected bookmarks. The device specific service 228 can provide a list of the video games that can be selected for use via a gaming system from which a request is received for the bookmarks. The device specific service 228 can be implemented for communication with any of the other media devices, content distributors, and services via the communication network 106, the IP-based network 114, and/or the wireless network 116.

Example methods 300 and 400 are described with reference to respective FIGS. 3 and 4 in accordance with one or more embodiments of a bookmark interpretation service. Generally, any of the functions, methods, procedures, components, and modules described herein can be implemented using hardware, software, firmware, fixed logic circuitry, manual processing, or any combination thereof. A software implementation of a function, method, procedure, component, or module represents program code that performs specified tasks when executed on a computing-based processor. Example methods 300 and 400 may be described in the general context of computer-executable instructions. Generally, computer-executable instructions can include software, applications, routines, programs, objects, components, data structures, procedures, modules, functions, and the like.

The method(s) may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 3:
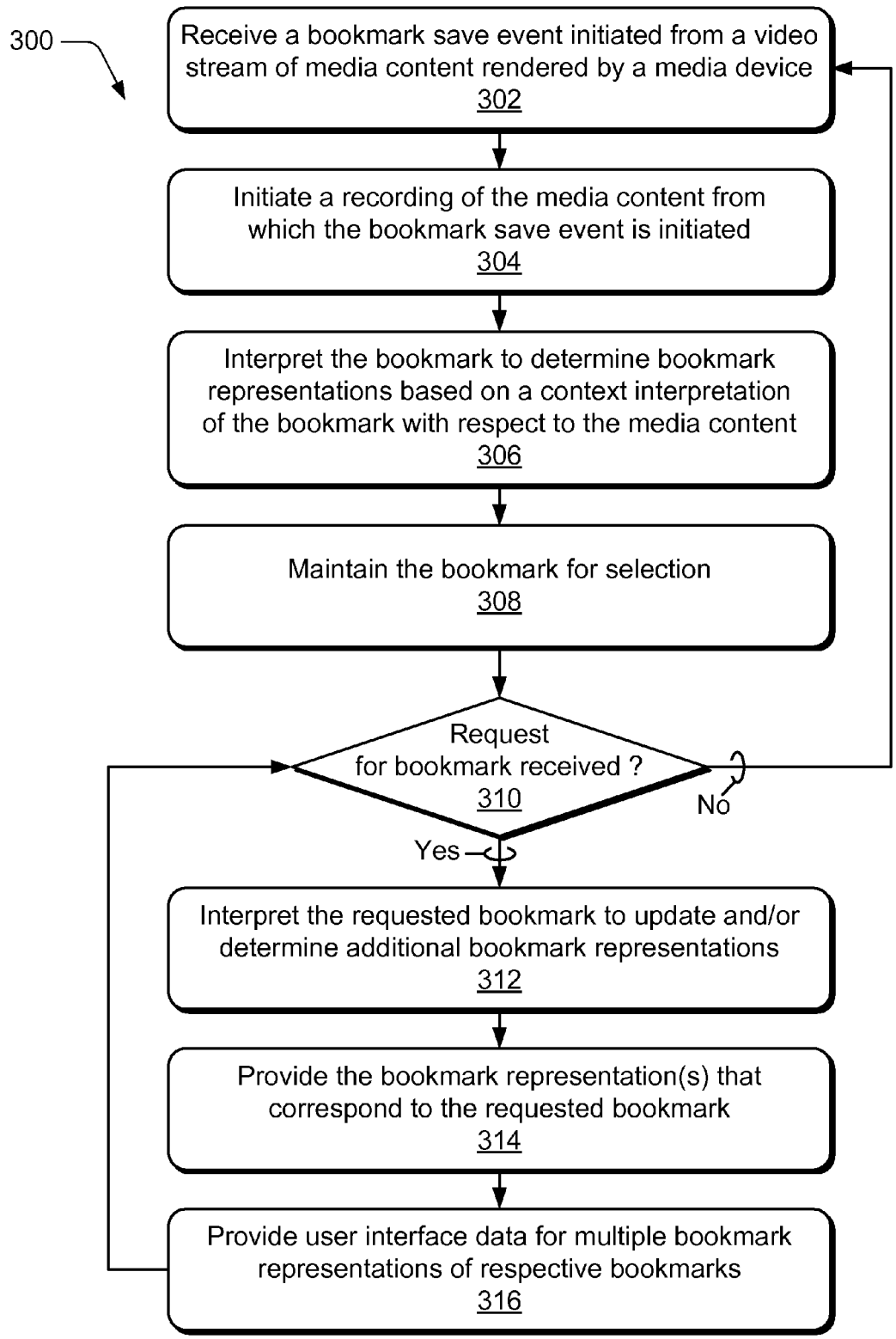
FIG. 3 illustrates example method(s) for a bookmark interpretation service in accordance with one or more embodiments.

FIG. 3 illustrates example method(s) 300 of a bookmark interpretation service. The order in which the method is described is not intended to be construed as a limitation, and any number of the described method blocks can be combined in any order to implement the method, or an alternate method.

At block 302, a bookmark save event is received from a media device when a bookmark is initiated while a video stream of media content is rendered by the media device. For example, the bookmark interpretation service 124 at content distributor 102 (FIG. 1) receives a bookmark save event that is selected or otherwise initiated by a user at a media device, such as when the user is watching a movie and initiates a bookmark to identify the movie, a scene in the movie, and/or some other feature or aspect of the movie.

At block 304, a recording is initiated of the media content from which the bookmark save event is initiated. For example, the bookmark interpretation service 124 receives the bookmark save event from the media device and initiates that the content distributor 102 record and maintain the media content as a recorded on-demand asset (e.g., an nDVR recording).

At block 306, the bookmark is interpreted to determine bookmark representations based on a context interpretation of the bookmark with respect to the media content. For example, the bookmark interpretation service 124 receives the bookmark save event and interprets the associated bookmark 144 to determine one or more bookmark representations 146 based on a context interpretation of the bookmark with respect to the media content from which the bookmark save event is initiated. A bookmark representation 146 can represent any number of various aspects of the media content from which a bookmark save event is initiated. In various embodiments, a bookmark representation 146 is interpreted based on a profile of a user that initiates the bookmark at a media device, based on a type of the media device from which the bookmark is initiated, and/or based on a type of media device that can render additional media content that corresponds to the bookmark representation.

At block 308, the bookmark is maintained for selection. For example, the storage media 118 at content distributor 102 maintains, persists, or otherwise stores the bookmarks 144 that are received from the various media devices as the bookmark save events. In addition, the storage media 118 maintains the bookmark representations 146 that correspond to the respective bookmarks 144.

At block 310, a determination is made as to whether a request for a bookmark is received. For example, a user or viewer at a media device can request a previously selected bookmark, to include requests such as a bookmark view event, a bookmark play event, or a bookmark share event. If a request for the bookmark is not received (i.e., "no" from block 310), then the method continues at block 302 to receive additional bookmark save events. If a request for the bookmark is received (i.e., "yes" from block 310), then at block 312, the requested bookmark is interpreted (e.g., re-interpreted in one embodiment) to update the bookmark representations and/or to determine additional bookmark representations that correspond to the bookmark.

At block 314, the bookmark representation(s) that correspond to the requested bookmark are provided in response to the request. Optionally at block 316, bookmark user interface data for multiple bookmark representations of respective bookmarks are provided in response to the request. In an embodiment, the bookmark interpretation service 124 initiates providing the bookmark user interface data to a media device that can receive and render the media content that is associated with a bookmark representation.

While the method 300 describes a sequence in which the dynamic interpretation or expansion of a bookmark occurs after receiving a bookmark save event (i.e., at block 306), other embodiments can be implemented to defer interpretation of a bookmark until a request for the bookmark is received (i.e., at block 310), or incrementally in association with any other user events or at other times.

Figure 4:
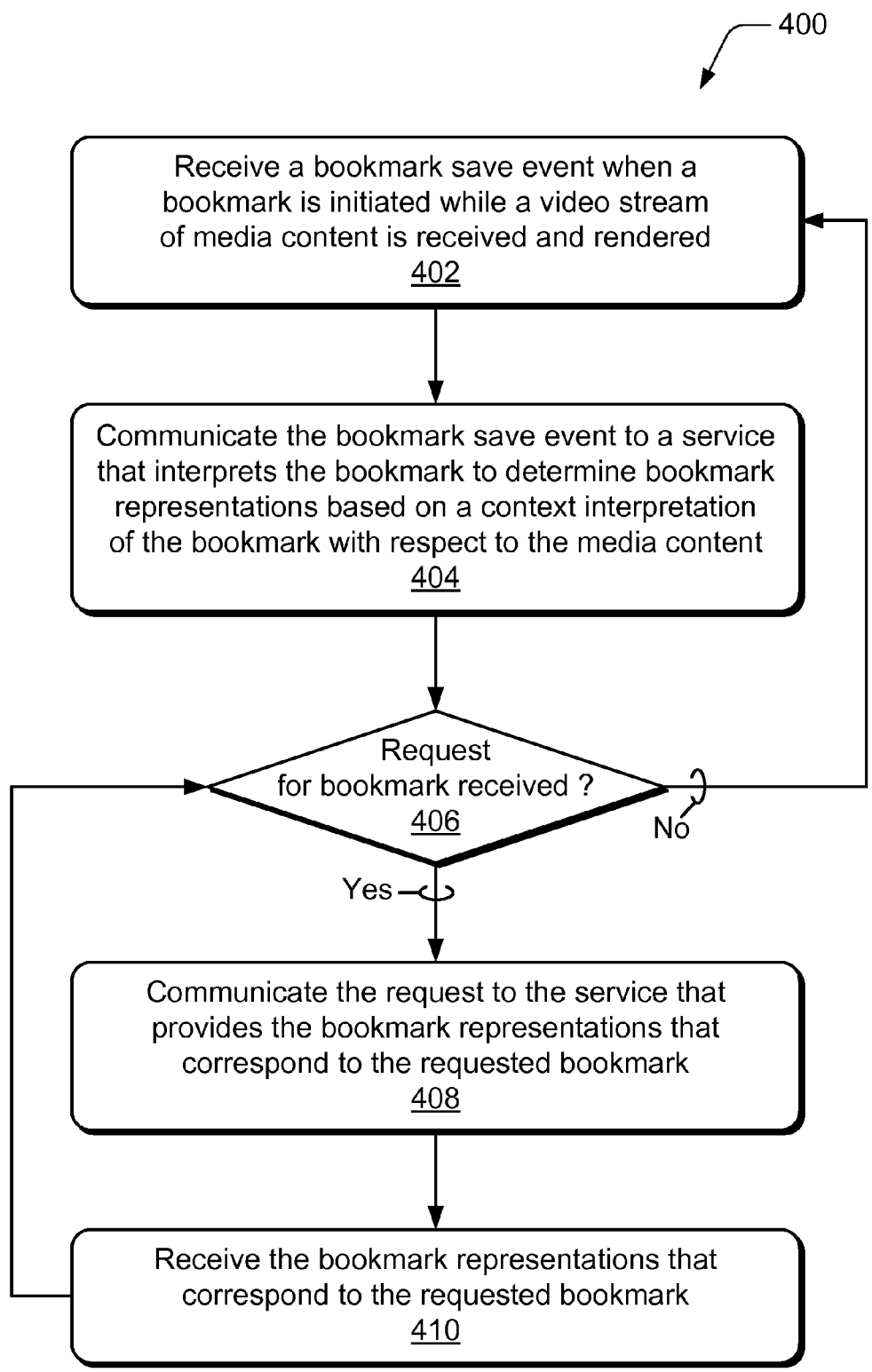
FIG. 4 illustrates example method(s) for a bookmark interpretation service in accordance with one or more embodiments.

FIG. 4 illustrates example method(s) 400 of a bookmark interpretation service. The order in which the method is described is not intended to be construed as a limitation, and any number of the described method blocks can be combined in any order to implement the method, or an alternate method.

At block 402, a bookmark save event is received at a media device when a bookmark is initiated while a video stream of media content is received and rendered at the media device. For example, media device 204 (FIG. 2) receives a bookmark save event that is selected or otherwise initiated by a user at the media device that renders the media content. At block 404, the bookmark save event is communicated to a service that interprets the associated bookmark to determine bookmark representations based on a context interpretation of the bookmark with respect to the media content from which the bookmark save event was selected. For example, media device 204 communicates a selected bookmark save event to the bookmark interpretation service 214 that interprets the bookmark to determine one or more bookmark representations that correspond to the bookmark.

At block 406, a determination is made as to whether a request for a bookmark is received. For example, a user or viewer at a media device can request a previously selected bookmark. If a request to view for the bookmark is not received (i.e., "no" from block 406), then the method continues at block 402 to receive additional bookmark save events. If a request for the bookmark is received (i.e., "yes" from block 406), then at block 408, the request is communicated to the service that provides bookmark representation(s) that correspond to the requested bookmark. For example, the media device 204 communicates the request for a bookmark to the bookmark interpretation service 214 that initiates providing the bookmark representations that correspond to the requested bookmark. As described above, the bookmark interpretation service 214 can defer interpretation of the requested bookmark to determine the bookmark representations until after receiving the request for the bookmark.

At block 410, the bookmark representations that correspond to the requested bookmark are received for display. For example, media device 204 receives the bookmark user interface data 222 and the user interface application 226 processes the data to render the bookmark user interface 210 for display at a media device 204. The bookmark user interface 210 includes one or more bookmark representations that correspond to respective selected bookmarks.

Figure 5:
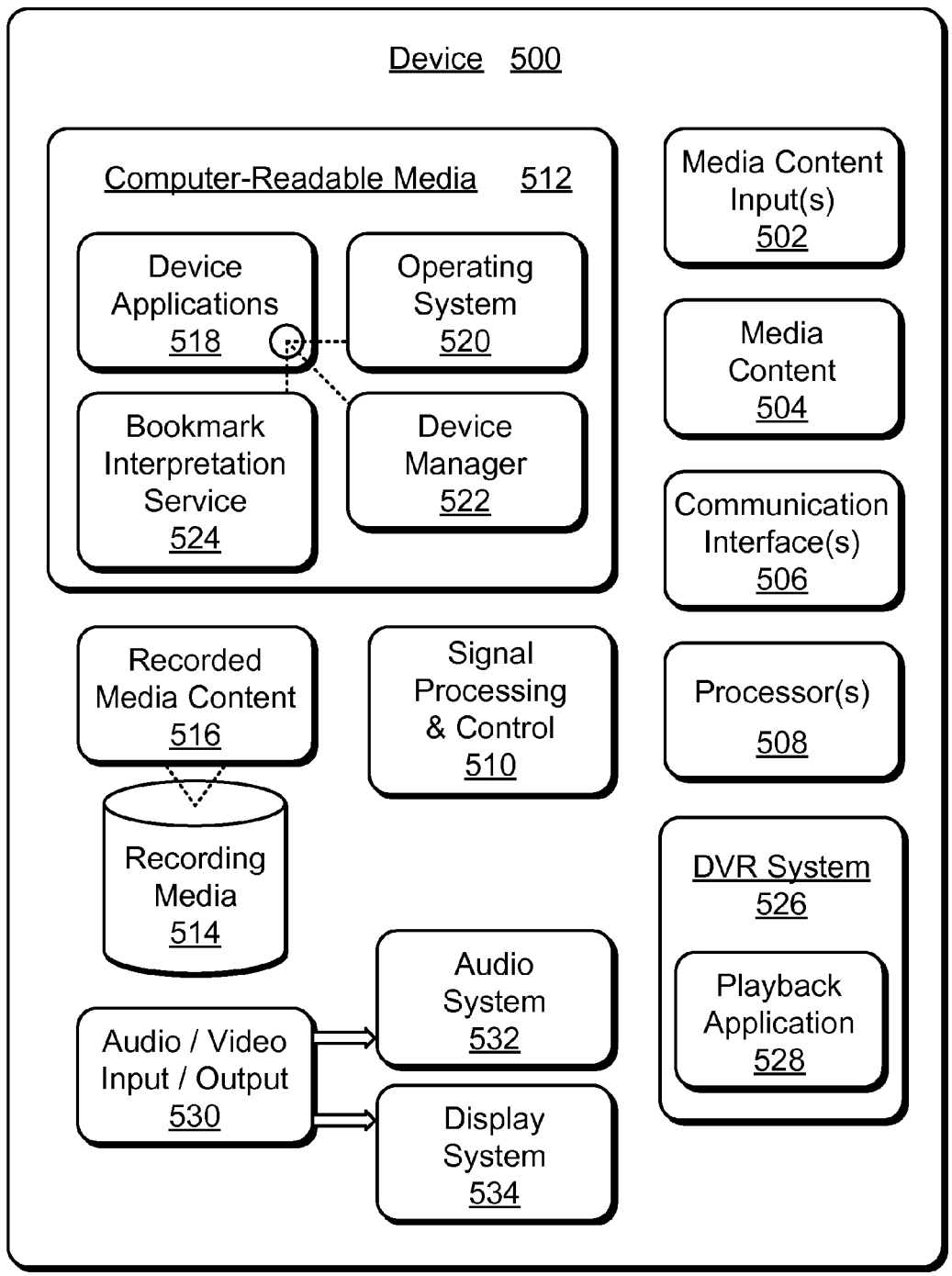
FIG. 5 illustrates various components of an example device which can implement embodiments of a bookmark interpretation service.

FIG. 5 illustrates various components of an example device 500 that can be implemented as any form of a computing, electronic, appliance, and/or media device to implement various embodiments of a bookmark interpretation service. For example, device 500 can be implemented as a content distributor, a bookmark interpretation service, and/or a media device as shown in FIG. 1 and/or FIG. 2. In various embodiments, device 500 can be implemented as any one or combination of a wired and/or wireless media device, a mobile phone device, a portable computer device, a television client device (e.g., a television set-top box, a digital video recorder (DVR), etc.), a computer device, a gaming system, an appliance device, an electronic device, and/or as any other type of media that may be implemented to receive media content in any form of audio, video, and/or image data.

Device 500 can include one or more media content inputs 502 via which any type of audio, video, and/or image media content 504 can be received from a media content source. The media content inputs 502 can include Internet Protocol (IP) inputs over which streams of media content are received via an IP-based network. Device 500 further includes one or more communication interfaces 506 that can be implemented as any one or more of a serial and/or parallel interface, a wireless interface, any type of network interface, a modem, and as any other type of communication interface. The communication interfaces 506 provide a connection and/or communication links between device 500 and a communication network by which other electronic, computing, and communication devices can communicate data with device 500.

Device 500 can include one or more processors 508 (e.g., any of microprocessors, controllers, and the like) which process various computer-executable instructions to control the operation of device 500, to communicate with other electronic and computing devices, and to implement embodiments of a bookmark interpretation service. Alternatively or in addition, device 500 can be implemented with any one or combination of hardware, firmware, or fixed logic circuitry that is implemented in connection with signal processing and control circuits which are generally identified at 510.

Device 500 can also include computer-readable media 512, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like. Device 500 may also include a recording media 514 to maintain recorded media content 516 (e.g., recorded on-demand media content, or assets) that device 500 receives and/or records.

Computer-readable media 512 provides data storage mechanisms to store media content 504, as well as various device applications 518 and any other types of information and/or data related to operational aspects of device 500. For example, an operating system 520 can be maintained as a computer application with the computer-readable media 512 and executed on the processors 508. The device applications 518 can also include a device manager 522 when device 500 is implemented as a media device and/or as a content distributor, and can include a bookmark interpretation service 524 when device 500 is implemented as a content distributor. In this example, the device applications 518 are shown as software modules and/or computer applications that can implement various embodiments of a bookmark interpretation service.

When implemented as a television client device, the device 500 can also include a DVR system 526 with a playback application 528 that can be implemented as a media control application to control the playback of recorded media content 516 and/or any other audio, video, and/or image media content 504 that can be rendered and/or displayed for viewing. The recording media 514 can maintain recorded media content that may include the media content 504 when it is received from a content distributor and recorded. For example, the media content 504 can be recorded when received as a viewer-scheduled recording, or when the recording media 514 is implemented as a pause buffer that records the media content 504 as it is being received and rendered for viewing.

Device 500 can also include an audio and/or video input/output system 530 that provides audio data to an audio rendering system 532 and/or provides video data to a display system 534. The audio rendering system 532 and/or the display system 534 can include any devices that process, display, and/or otherwise render audio, video, and image data. Video signals and audio signals can be communicated from device 500 to an audio device and/or to a display device via an RF (radio frequency) link, S-video link, composite video link, component video link, DVI (digital video interface), analog audio connection, or other similar communication link. In an embodiment, audio rendering system 532 and/or the display system 534 can be implemented as external components to device 500. Alternatively, the audio rendering system 532 and/or the display system 534 can be implemented as integrated components of the example device 500.

Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Figure 6:
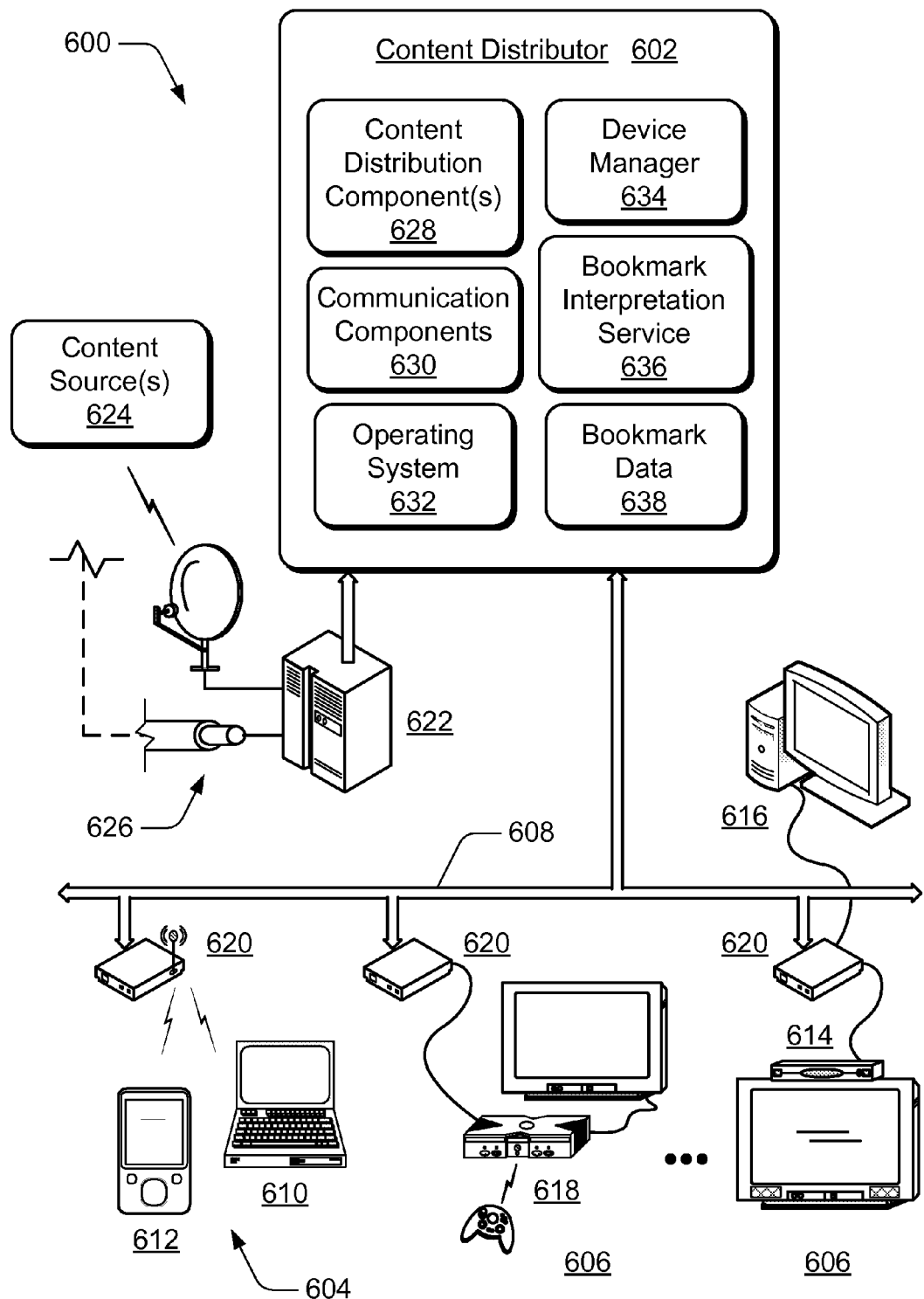
FIG. 6 illustrates various devices and components in an example media content distribution system in which embodiments of a bookmark interpretation service can be implemented.

FIG. 6 illustrates an example media content distribution system 600 in which various embodiments of a bookmark interpretation service can be implemented. System 600 facilitates the distribution of media content, content metadata, and/or other associated data to multiple viewers, users, viewing systems, and devices. System 600 includes a content distributor 602 and any number of wired and/or wireless media devices. The media devices can include wireless media devices 604 as well as other client devices that are implemented as components in various client systems 606, each configured for data communication via a communication network 608. Each of the media devices and other client devices can receive media content, program content, program guide data, advertising content, closed captions data, content metadata, and the like from content server(s) of the content distributor 602 via the communication network 608.

The wireless media devices 604 can include any type of device implemented to receive and/or communicate wireless data, such as a portable computer device 610, a media device 612 (e.g., a personal media player, portable media player, etc.), and/or any other wireless media device that can receive content in any form of audio, video, and/or image media content. Each of the client systems 606 can include a respective client device and display device that together render media content in any form of audio, video, and/or image data. A client device in a client system 606 can be implemented as any one or combination of a television client device 614 (e.g., a television set-top box, a digital video recorder (DVR), etc.), a computer device 616, a gaming system 618, an appliance device, an electronic device, and/or as any other type of client device that may be implemented to receive any form of audio, video, and/or image media content.

The communication network 608 can be implemented as any one or combination of a wide area network (e.g., the Internet), a local area network (LAN), an intranet, an IP-based network, a broadcast network, a wireless network, a Digital Subscriber Line (DSL) network infrastructure, a point-to-point coupling infrastructure, or as any other media content distribution network. Additionally, communication network 608 can be implemented using any type of network topology and any network communication protocol, and can be represented or otherwise implemented as a combination of two or more networks. A digital network can include various hardwired and/or wireless links 620, such as routers, gateways, and so on to facilitate communication between content distributor 602 and the various media devices.

System 600 includes a media server 622 that receives content from various content sources 624, such as media content from a content provider, program guide data from a program guide source, and advertising content from an advertisement provider. The media server 622 can represent an acquisition server that receives audio, video, and/or image media content from a content provider; an EPG server that receives program guide data from a program guide source; and/or an advertising management server that receives advertising content from an advertisement provider.

The content sources 624 control distribution of the media content, the program guide data, and the advertising content to the media server 622 and/or to other servers of system 600. The media content, program guide data, and advertising content can be distributed via various transmission media 626, such as satellite transmission, radio frequency transmission, cable transmission, and/or via any number of other wired or wireless transmission media. In this example, media server 622 is shown as an independent component of system 600 that communicates the media content, program guide data, and advertising content to content distributor 602. In an alternate implementation, media server 622 can be implemented as a component of content distributor 602.

Content distributor 602 is representative of a networked content distribution system that provides the media content, program guide data, advertising content, and content metadata to multiple subscribers (e.g., the various media devices and client systems 606). The content distributor 602 can be implemented as a networked operator to control distribution of media content, program and advertising content, and any other audio, video, and/or image content to the media devices and client systems 606.

Content distributor 602 includes various content distribution components 628 to facilitate media content processing and distribution, such as a subscriber manager, a device monitor, and one or more content servers. The subscriber manager manages subscriber data, and the device monitor maintains client state information and monitors the media devices, client devices, and/or the client systems. Although the various managers, servers, and monitors of content distributor 602 (to include the media server 622 in one embodiment) are described as distributed, independent components, any one or more of the managers, servers, and monitors can be implemented together as a multi-functional component of content distributor 602. Additionally, any one or more of the managers, servers, and monitors described with reference to system 600 can implement features and embodiments of a bookmark interpretation service.

The content distributor 602 can also include communication components 630 that are implemented to facilitate media content distribution to the various media devices and other client devices via the communication network 608. The content distributor 602 can also include one or more processors to process various computer-executable instructions, such as an operating system 632, a device manager 634, and a bookmark interpretation service 636. The content distributor 602 can also include computer-readable media for data storage to maintain bookmark data 638 for embodiments of a bookmark interpretation service.

Although embodiments of a bookmark interpretation service have been described in language specific to features and/or methods, it is to be understood that the subject of the appended claims is not necessarily limited to the specific features or methods described. Rather, the specific features and methods are disclosed as example implementations of a bookmark interpretation service.

The invention claimed is:

1. A method, comprising:
   maintaining a user profile of a user to track user requests for media content; receiving a bookmark save event from a media device when a bookmark is initiated by the user while a video stream of media content is rendered by the media device;
   interpreting the bookmark to determine one or more bookmark representations based on a context interpretation of the bookmark with respect to the media content and based on the user requests that are tracked in the user profile for different types of the media content, the one or more bookmark representations derived from metadata that accompanies the media content;
   maintaining the bookmark for selection; and
   providing one or more of the bookmark representations that correspond to the bookmark when a request for the bookmark is received.

2. A method as recited in claim 1, wherein a bookmark representation corresponds to the media content from which the bookmark save event is initiated.

3. A method as recited in claim 1, further comprising initiating a recording of the media content from which the bookmark save event is initiated, and wherein a bookmark representation corresponds to an on-demand recording of the media content.

4. A method as recited in claim 1, further comprising interpreting the bookmark to determine the one or more bookmark representations based on a type of the media device from which the bookmark save event is initiated.

5. A method as recited in claim 1, further comprising interpreting the bookmark to determine the one or more bookmark representations based on a type of the media device that can render a bookmark representation.

6. A method as recited in claim 1, further comprising interpreting the bookmark to determine the one or more bookmark representations based on the user profile of the user that initiates the bookmark save event at the media device.

7. A method as recited in claim 1, wherein the media content is a movie, and wherein a bookmark representation corresponds to a scene in the movie.

8. A method as recited in claim 1, wherein the media content is an advertisement, and wherein a bookmark representation corresponds to a product or service offered in the advertisement.

9. A method as recited in claim 1, further comprising determining music that is playing in a background of the media content, and wherein a bookmark representation corresponds to the music.

10. A method as recited in claim 1, further comprising determining a person that is associated with the media content, and wherein a bookmark representation corresponds to the person.

11. A method as recited in claim 1, further comprising receiving a request from the media device to share the bookmark, and communicating the bookmark to an additional media device.

12. A content distributor, comprising:
    a storage media configured to:
      maintain bookmarks when initiated at media devices as bookmark save events that are associated with video streams of media content that are rendered by the media devices;
      maintain bookmark representations that correspond to the bookmarks; and
      maintain user profiles of users to track user requests for media content;
    a bookmark interpretation service configured to:
      receive a bookmark save event from a media device to create a bookmark;
      interpret the bookmark to determine one or more bookmark representations based on a context interpretation of the bookmark with respect to the media content from which the bookmark save event is initiated and based on the user requests from a user that are tracked in a user profile for different types of the media content, the one or more bookmark representations derived from metadata that accompanies the media content; and provide one or more of the bookmark representations that correspond to the bookmark when a request for the bookmark is received.

13. A content distributor as recited in claim 12, wherein a bookmark representation corresponds to the media content from which the bookmark is selected.

14. A content distributor as recited in claim 12, wherein the bookmark interpretation service is further configured to initiate a recording of the media content from which the bookmark save event is initiated, and wherein a bookmark representation corresponds to an on-demand recording of the media content.

15. A content distributor as recited in claim 12, wherein the bookmark interpretation service is further configured to interpret the bookmark to determine a bookmark representation based on a type of the media device from which the bookmark save event is received.

16. A content distributor as recited in claim 12, wherein the bookmark interpretation service is further configured to interpret the bookmark to determine a bookmark representation based on a type of the media device that can render the bookmark representation.

17. A content distributor as recited in claim 12, wherein the bookmark interpretation service is further configured to interpret the bookmark to determine a bookmark representation based on the profile of the user that initiates the bookmark save event at the media device.

18. A content distributor as recited in claim 12, wherein the bookmark interpretation service is further configured to provide bookmark user interface data for the one or more bookmark representations, the bookmark user interface data being provided to the media device based on whether the media device can receive and render additional media content that corresponds to the one or more bookmark representations.

19. One or more computer-readable storage media devices comprising computer-executable instructions that, when executed, direct a bookmark interpretation service to:

maintain a user profile of a user to track user requests for media content;

receive a bookmark save event from a media device when a bookmark is initiated by the user from a video stream of media content that is rendered by the media device;

interpret the bookmark to determine one or more bookmark representations based on a context interpretation of the bookmark with respect to the media content and based on the user requests that are tracked in the user profile for different types of the media content, the one or more bookmark representations derived from metadata that accompanies the media content;

receive a request for the bookmark from the media device; and provide one or more of the bookmark representations that correspond to the bookmark to the media device.

20. One or more computer-readable storage media devices as recited in claim 19, further comprising computer-executable instructions that, when executed, direct the bookmark interpretation service to initiate a recording of the media content from which the bookmark save event is initiated, and provide a bookmark representation that corresponds to an on-demand recording of the media content.

* * * * *